(12) United States Patent
Shang et al.

(10) Patent No.: US 12,373,735 B2
(45) Date of Patent: Jul. 29, 2025

(54) METHOD FOR PRE-TRAINING LANGUAGE MODEL

(71) Applicant: BEIJING BAIDU NETCOM SCIENCE TECHNOLOGY CO., LTD., Beijing (CN)

(72) Inventors: Junyuan Shang, Beijing (CN); Shuohuan Wang, Beijing (CN); Siyu Ding, Beijing (CN); Yanbin Zhao, Beijing (CN); Chao Pang, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 294 days.

(21) Appl. No.: 18/179,627

(22) Filed: Mar. 7, 2023

(65) Prior Publication Data
US 2023/0252354 A1     Aug. 10, 2023

(30) Foreign Application Priority Data

May 20, 2022    (CN) .......................... 202210552543.9

(51) Int. Cl.
    *G06F 40/40*        (2020.01)
    *G06F 40/279*      (2020.01)
    *G06N 20/00*       (2019.01)

(52) U.S. Cl.
    CPC .......... *G06N 20/00* (2019.01); *G06F 40/279* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 2017/0300563 A1* | 10/2017 | Kao | ........................ G06F 16/36 |
| 2019/0236464 A1* | 8/2019 | Feinson | ................. G06N 3/006 |
| 2022/0308848 A1* | 9/2022 | Clement | ................... G06F 8/51 |

FOREIGN PATENT DOCUMENTS

| | | |
|---|---|---|
| CN | 110717339 A | 1/2020 |
| CN | 113705187 A | 11/2021 |
| CN | 114036300 A | 2/2022 |
| JP | 2012146263 A | 8/2012 |
| JP | 2022028871 A | 2/2022 |
| WO | 2020252950 A1 | 12/2020 |

OTHER PUBLICATIONS

JPO, Office Action for JP Application No. 2022-169714, Oct. 17, 2023.
Cnipa, First Office Action for CN Application No. 202210552543.9, Jun. 26, 2023.

* cited by examiner

*Primary Examiner* — Quynh H Nguyen
(74) *Attorney, Agent, or Firm* — Hodgson Russ LLP

(57) ABSTRACT

A method for pre-training a language model includes: constructing a pre-training language data set, in which the pre-training language data set comprises unsupervised language data and supervised language data; generating a hierarchical multi-template and multi-task language data set based on the pre-training language data set; and pre-training the language model based on the hierarchical multi-template and multi-task language data set.

10 Claims, 6 Drawing Sheets

METHOD FOR PRE-TRAINING LANGUAGE MODEL

CROSS-REFERENCE TO RELATED APPLICATIONS

This application claims priority to Chinese Patent Application No. 202210552543.9, filed on May 20, 2022, the entire disclosure of which is incorporated herein by reference.

FIELD

The present disclosure relates to the field of computer technology, specifically to the field of artificial intelligence, and particularly to the field of in-depth learning technology, and more particularly to a method and an apparatus for pre-training a language model, an electronic device, a storage medium and a program product.

BACKGROUND

In the related art, a multitask-based finetuning technology and a multitask-based pre-training technology allow a large-scale language model to have a strong general text generation capability. However, in the related art, the multitask-based finetuning technology cannot allow the model to learn general knowledge from unsupervised data, and thus the model cannot learn continuously. In the multitask-based pre-training technology, a template design for the model lacks diversity, which affects the robustness of the model.

Therefore, there is an urgent need for providing a method for pre-training a language model which is capable of continuously learning, increasing the diversity of the template and improving the robustness of multi-task learning of the model.

SUMMARY

According to a first aspect of the present disclosure, there is provided a method for pre-training a language model, including: constructing a pre-training language data set, in which the pre-training language data set includes unsupervised language data and supervised language data; generating a hierarchical multi-template and multi-task language data set based on the pre-training language data set; and pre-training the language model based on the hierarchical multi-template and multi-task language data set.

According to a second aspect of the present disclosure, there is provided an apparatus for pre-training a language model, including: a constructing module, configured to construct a pre-training language data set, in which the pre-training language data set includes unsupervised language data and supervised language data; a generating module, configured to generate a hierarchical multi-template and multi-task language data set based on the pre-training language data set; and a pre-training module, configured to pre-train the language model based on the hierarchical multi-template and multi-task language data set.

According to a third aspect of the present disclosure, there is provided an electronic device, including: at least one processor; and a memory, communicatively connected to the at least one processor. The memory stores instructions executable by the at least one processor, and the instructions are executed by the at least one processor to enable the at least one processor to perform the method in the above aspect of the present disclosure.

According to a fourth aspect of the present disclosure, there is provided a non-transitory computer readable storage medium having computer instructions stored thereon. The computer instructions are configured to cause a computer to execute the method as described in the above aspect of the present disclosure.

According to a fifth aspect of the present disclosure, there is provided a computer program product, including a computer program that, when executed by a processor, causes the processor to perform the method as described in the above aspect of the present disclosure.

According to a sixth aspect of the present disclosure, there is provided a text generation method. The text generation method includes: acquiring a task of generating a text; and inputting the task into a language model to acquire a text result output by the language model. The language model is pre-trained by the method as described in the above aspect of the present disclosure.

BRIEF DESCRIPTION OF THE DRAWINGS

The accompanying drawings are used for better understanding the embodiments and do not constitute a limitation on the present disclosure, in which.

DETAILED DESCRIPTION

Description will be made below to embodiments of the disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

In embodiments of the present disclosure, acquisition, storage, application and the like of user's personal information involved are carried out with the consent of user, and all comply with the provisions of relevant laws and regulations, and do not violate public order and good customs.

Description will be made below to a method and an apparatus for a method for pre-training a language model, and an electronic device according to embodiments of the present disclosure with reference to accompanying drawings.

Figure 1:
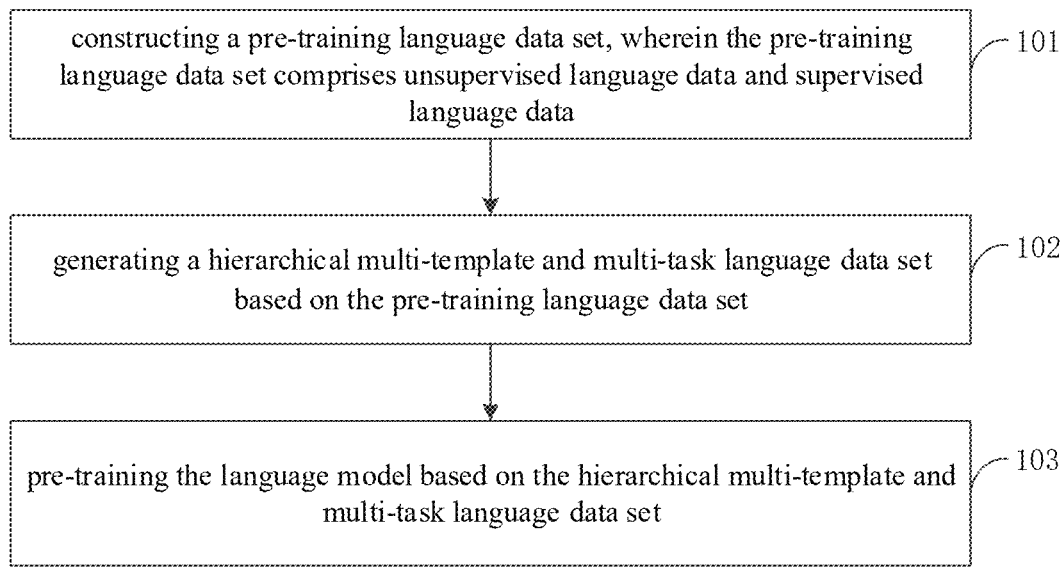
FIG. 1 is a flow chart of a method for pre-training a language model according to embodiments of the present disclosure.

FIG. 1 is a flow chart of a method for pre-training a language model according to embodiments of the present disclosure. The method may include the following operations in blocks.

At block 101, a pre-training language data set is constructed, wherein the pre-training language data set includes unsupervised language data and supervised language data.

Figure 2:
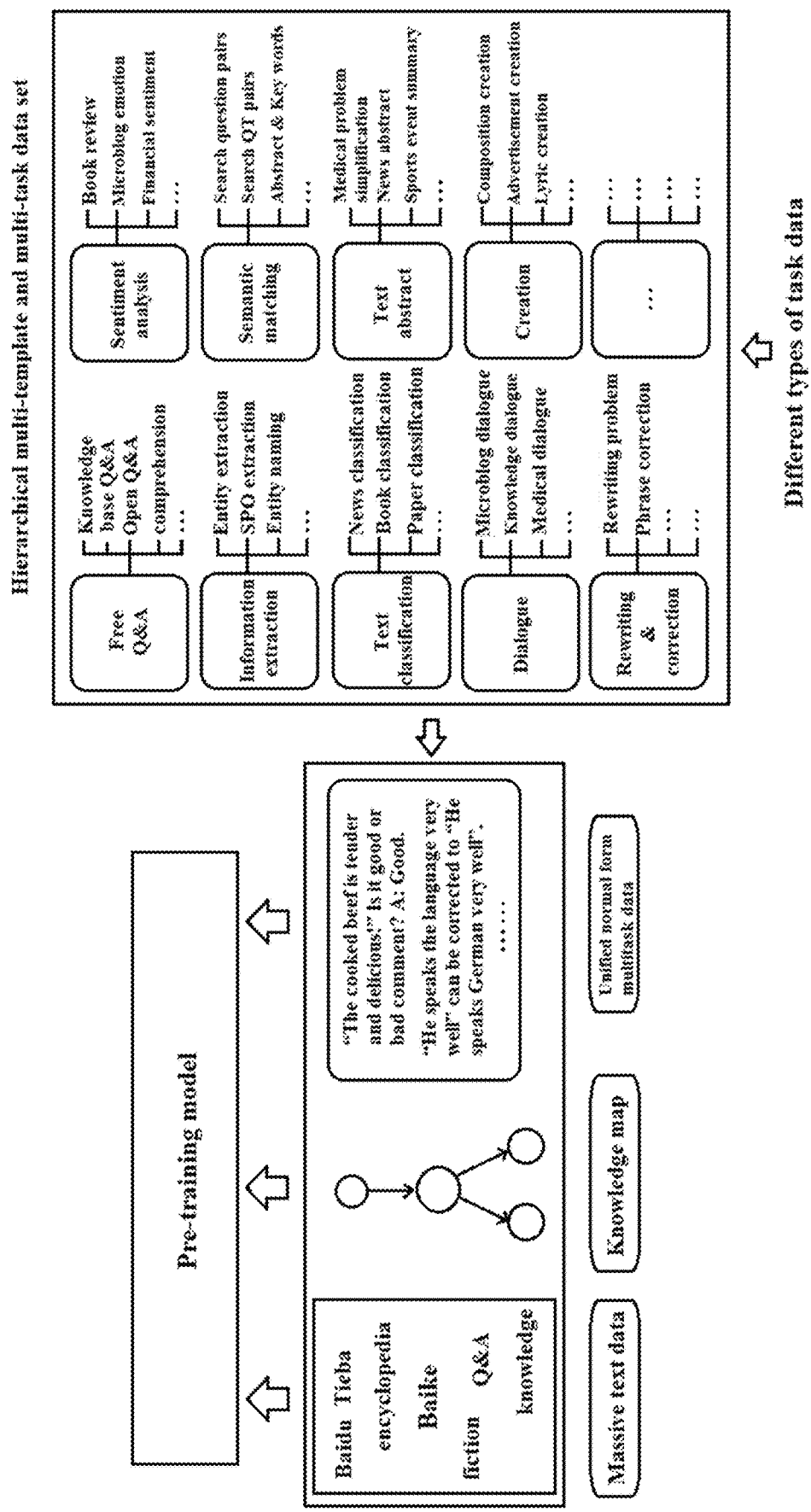
FIG. 2 is a schematic diagram illustrating a pre-trained data set of a language model according to embodiments of the present disclosure.

FIG. 2 is a schematic diagram illustrating a pre-trained data set of the language model according to embodiments of the present disclosure. As shown in FIG. 2, in an embodiment of the present disclosure, the unsupervised language data may be massive text data and knowledge maps.

For example, in an embodiment of the present disclosure, the massive text data may be text data from web pages, text data from other search engines, etc. and the knowledge map may be triplet data in a knowledge base system with a directed graph structure.

As shown in FIG. 2, in an embodiment of the present disclosure, the supervised language data may be multi-tasked language data. Specifically, in an embodiment of the present disclosure, the multi-task language data may include: common natural language understanding and generating tasks.

For example, in an embodiment of the present disclosure, the supervised language data set may include a free question and answer data set, an emotion analysis data set, a semantic matching data set, a text categorization data set, a text summarization data set, etc.

At block 102, a hierarchical multi-template and multi-task language data set is generated based on the pre-training language data set.

In an embodiment of the present disclosure, the pre-training language data set includes supervised language data, and the supervised language data includes a multi-task language data set. For each task language data set in the multi-task language data set, a corresponding task template is set, and each task template corresponds to at least one task sub-template.

In an embodiment of the present disclosure, the hierarchical multi-template and multi-task language data set is generated by dividing each task language data set into at least one task category based on the at least one task sub-template corresponding to each task language data set.

Figure 3:
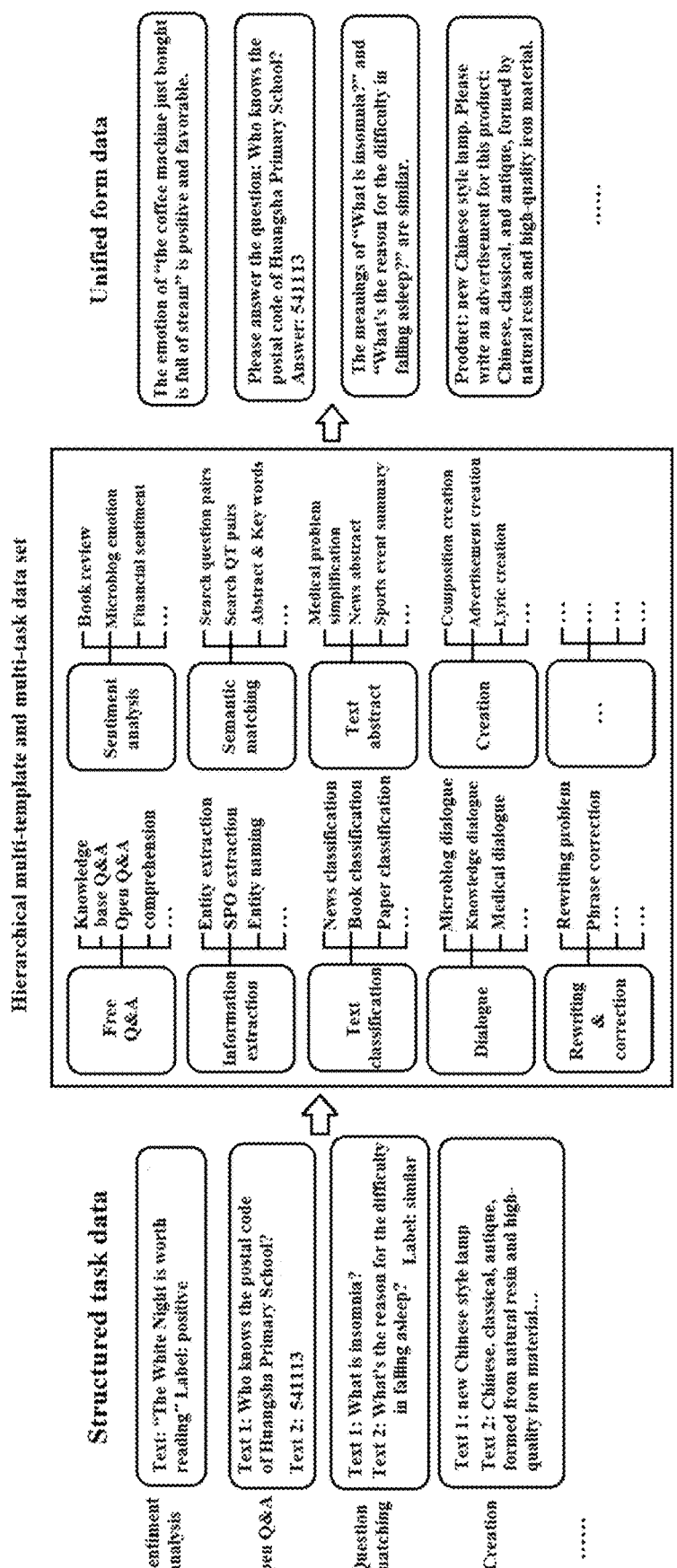
FIG. 3 is a schematic diagram illustrating a hierarchical multi-template and multi-task data set generated based on a pre-trained data set of a language model according to embodiments of the present disclosure.

As an example, FIG. 3 is a schematic diagram illustrating a hierarchical multi-template and multi-task data set generated based on a pre-trained data set of a language model according to embodiments of the present disclosure. In an embodiment of the present disclosure, as shown in FIG. 3 including three sub-diagrams, the sub-diagram on the left is a multi-task data set, in which task templates such as emotion analysis, open question and answer, question matching and advertisement creation are set for the multi-task data set, and each task template has corresponding sample text. The sub-diagram in the middle shows that each task data set may be divided into at least one task category based on at least one task sub-template corresponding to each task template. For example, it shows a book review sub-template, a financial sentiment sub-template, etc., which may be classified into the emotion analysis task category. Further, the sub-graph on the right shows a hierarchical multi-template and multi-task language data set generated, i.e. a data set of sample text in a unified form.

It should be explained that in an embodiment of the present disclosure, the multi-tasking language data set is structured supervised language data, and the operation of dividing each task language data set into at least one task category based on at least one task sub-template corresponding to each task language data set may be performed according to experience and knowledge.

At block 103, the language model is pre-trained based on the hierarchical multi-template and multi-task language data set.

In an embodiment of the present disclosure, the operation of pre-training the language model based on the hierarchical multi-template and multi-task language data set may include: realizing hierarchical modeling by splicing the continuous template before the sample text, and the method includes the following operations: obtaining a sample text from the language model; obtaining a task template and a task sub-template corresponding to the sample text based on a task category to which the sample text belongs; generating a continuous template based on the task template and the task sub-template corresponding to the sample text; and pre-training the language model by inputting the sample text and the continuous template into the language model.

In an embodiment of the present disclosure, the language model may be generated by training multi-granularity unsupervised language data.

For example, in an embodiment of the present disclosure, the language model can train sample language data of words, sentences, paragraphs, and chapters from the massive unsupervised language data from fine to coarse, first to fourth granularities, and the training of the language model may be bidirectional training.

Figure 4:
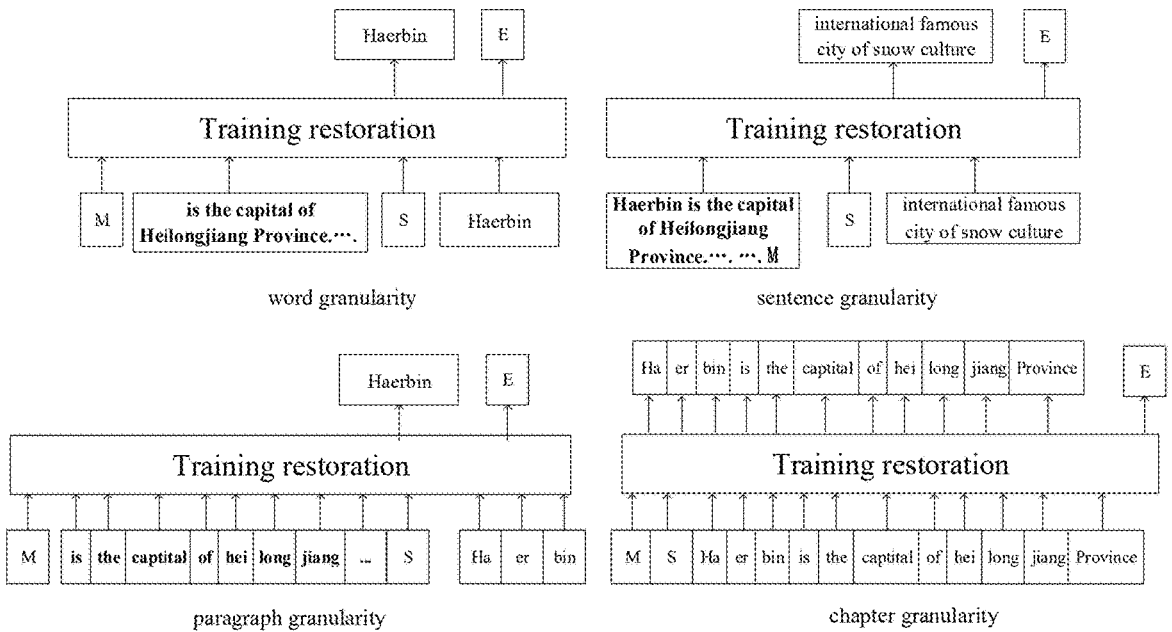
FIG. 4 is a schematic diagram illustrating sample language data of first to fourth granularities according to embodiments of the present disclosure.

For example, in an embodiment of the present disclosure, FIG. 4 is a schematic diagram illustrating sample language data of first to fourth granularities according to embodiments of the disclosure. As shown in FIG. 4, an input may be a bidirectional encoding input (bold font) or a unidirectional decoding input (regular font), and the input contents may be partially modelled bidirectionally. As shown in FIG. 4, M represents a mask character, S represents a start generation character, and E represents an end character. The different granularities of words, sentences, paragraphs and chapters are distinguished by the mask character (M). For example, in a bidirectional generation task of word granularity, where the two words, "Harbin" and "Snow", are replaced by the mask character, the model needs to learn how to restore the mask character in the bidirectional encoding input (bold font) by modeling input.

In an embodiment, a generation branch based on the language model is performed by jointly training with unsupervised general knowledge and supervised task knowledge. The language model is pre-trained with the following objective function:

$$L = \Sigma_{i=1}^{n} -\log P(x_i|x_{<i}) + \Sigma_{j=1}^{m} -\log P(y_j|x, y_{<j})$$

where x represents a sample text with a total length n, and y represents a supervised data set with a total length m. A loss value of the first half, i.e., $\Sigma_{i=1}^{n} -\log P(x_i|x_{<i})$ is optimized on the unsupervised language data (i.e., the unsupervised general data), and a loss value of the second half, i.e., $\Sigma_{i=1}^{n} -\log P(x_i|x_{<i})$ is optimized on the supervised language data (i.e., the supervised task data). The unified modeling is carried out by adopting a language model. For an $i^{th}$ character, information of 0~i−1 characters is visible. Characters of 0~s are visible in the two directions, while characters of s~i are visible in one direction.

Figure 5:
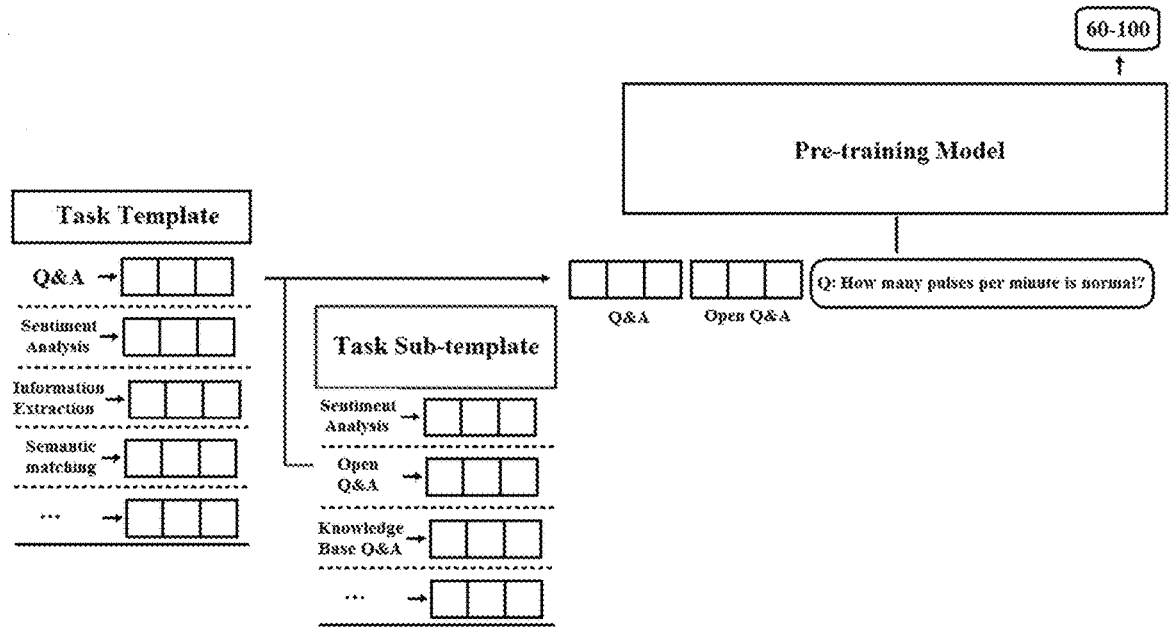
FIG. 5 is a schematic diagram illustrating pre-training a language model based on a hierarchical multi-template and multi-task language data set according to embodiments of the present disclosure.

FIG. 5 is a schematic diagram illustrating pre-training a language model based on a hierarchical multi-template and multi-task language data set according to embodiments of the present disclosure. In an embodiment of the present disclosure, as shown in FIG. 5, the continuous template may be a vector for learning which can be input into the model together with the sample text, and optimized based on the task template and task sub-template corresponding to the sample text after jointly training with the unsupervised general knowledge and the supervised task knowledge in the generation branch of the pre-trained model.

After the hierarchical multi-template and multi-task pre-training is completed, the migration ability of the pre-training model can be enhanced. Since the task continuous template is trained with multi-task data, the migration ability will be enhanced. Thus, in the case of zero samples or few samples, data of the same task type for the hierarchical multi-template and multi-task data set has the migration ability. Meanwhile, the task template and task sub-template corresponding to the continuous template (e.g., a question and answer template and an open question and answer sub-template as shown in FIG. 5) can better guide the model to complete the task corresponding to the specific data set.

Further, in order to introduce hierarchical artificial prior knowledge, N trainable word vectors (continuous templates also referred as continuous prompts) are allocated to each task type and language data set, which are spliced before the original text to assist the model to learn the hierarchical multi-task knowledge. In the training phase, the supervised optimization objective in the objective function for pre-training the language model can be modified to make it depend on the continuous template of the task and data set. The function can be modified as follows:

$$L = \Sigma_{i=1}^{n} -\log P(x_i|x_{<i}) + \Sigma_{j=1}^{m} -\log P(y_j|x, y_{<j}, T_0, T_1, \ldots, T_N, D_0, D_1, \ldots D_N)$$

where T* and D* are continuous templates of the task and the data set, respectively, and the continuous template for each of the tasks and the data sets is different, and their initial values can be determined randomly like other parameters of the model before training. During training, a corresponding continuous template is selected to be spliced with the original text according to a label of the task and the language data set in the hierarchical multi-template and multi-task language data, and is input into the language model for optimization.

In the method for pre-training the language model of the embodiments of the present disclosure, the pre-training language data set is constructed, in which the pre-training language data set includes the unsupervised language data and the supervised language data; the hierarchical multi-template and multi-task language data set is generated based on the pre-training language data set; the language model is pre-trained based on the hierarchical multi-template and multi-task language data set. Therefore, according to the embodiments of the present disclosure, the tasks can be uniformly templated by constructing the multi-template and multi-task language data set, so that the model can simultaneously model multi-task data, and by setting multiple tasks, the diversity of the model is increased and the robustness of the task learning of the model is improved. The knowledge related to the task and the data set can be better learned by using the continuous template during the pre-training of the model, and the migration capability of the model in the case of zero sample or few samples is improved.

Based on the construction of the pre-training language data set, the present disclosure provides jointly training the language model with the unsupervised general data and the supervised task data, so that the language model can not only model the task data, but also continuously learn the general knowledge from the unsupervised data, so as to avoid forgetting the knowledge.

After the language model is trained, it may be used for text generation. For example, a user may input a task, e.g., of writing an advertisement for a product, into the trained language model, and the model can output a text.

In an embodiment of the present disclosure, the text generation method includes: acquiring a task of generating a text; and inputting the task into a language model to acquire a text result output by the language model. The language model is pre-trained by the method for pre-training the language model as described in the embodiments of the present disclosure.

Figure 6:
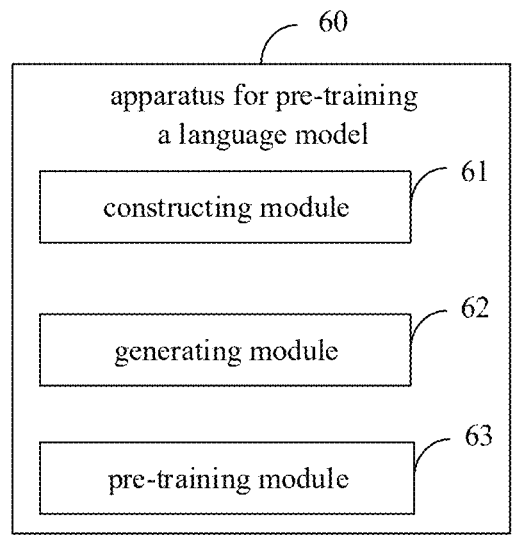
FIG. 6 is a block diagram illustrating an apparatus for pre-training a language model according to embodiments of the present disclosure.

To achieve the above embodiments, the present disclosure further provides an apparatus for pre-training a language model. FIG. 6 is a block diagram illustrating an apparatus 60 for pre-training a language model according to embodiments of the present disclosure.

As shown in FIG. 6, the apparatus 60 includes: a constructing module 61, configured to construct a pre-training language data set, in which the pre-training language data set includes unsupervised language data and supervised language data; a generating module 62, configured to generate a hierarchical multi-template and multi-task language data set based on the pre-training language data set; and a pre-training module 63, configured to pre-train the language model based on the hierarchical multi-template and multi-task language data set.

Figure 7:
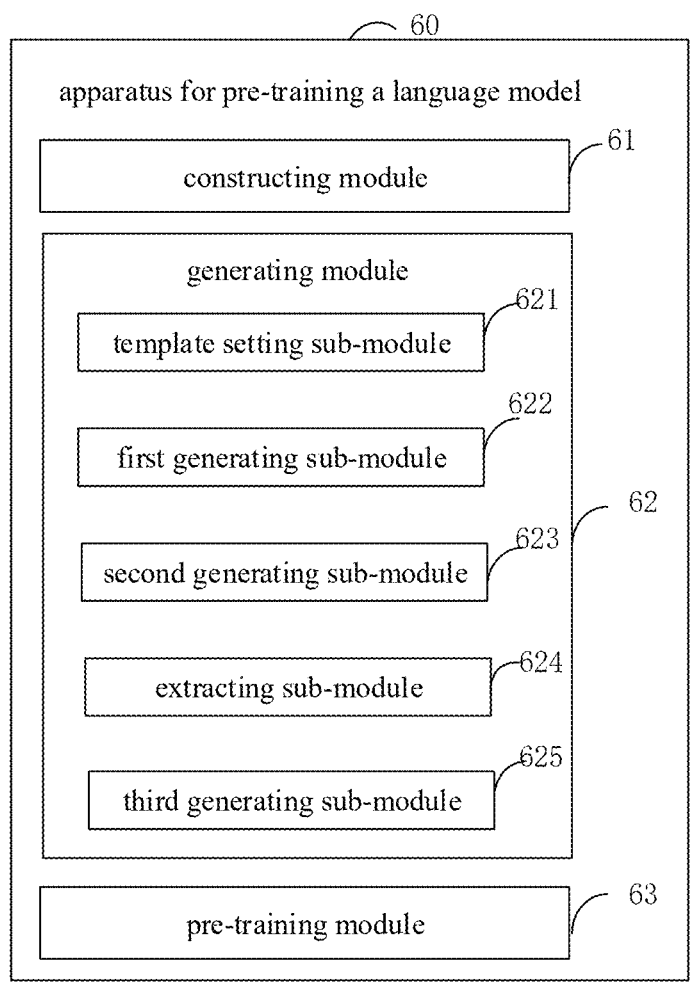
FIG. 7 is a block diagram illustrating an apparatus for pre-training a language model according to further embodiments of the present disclosure.

As shown in FIG. 7, in an embodiment, the generating module 62 includes: a template setting sub-module 621, configured to set a task template corresponding to each task language data set in the multi-task language data set, and at least one task sub-template corresponding to each task template; and a first generating sub-module 622, configured to generate the hierarchical multi-template and multi-task language data set by dividing each task language data set into at least one task category based on the at least one task sub-template corresponding to each task language data set.

As shown in FIG. 7, in an embodiment, the generating module 62 includes: a second generating sub-module 623, configured to generate the language model by training with multi-granularity unsupervised language data.

As shown in FIG. 7, in an embodiment, the generating module 62 includes: an extracting sub-module 624, configured to extract sample language data of first, second, third and fourth granularities from the unsupervised language data; and a third generating sub-module 625, configured to generate the language model by training an initial model based on the sample language data of each of the first to fourth granularities.

Figure 8:
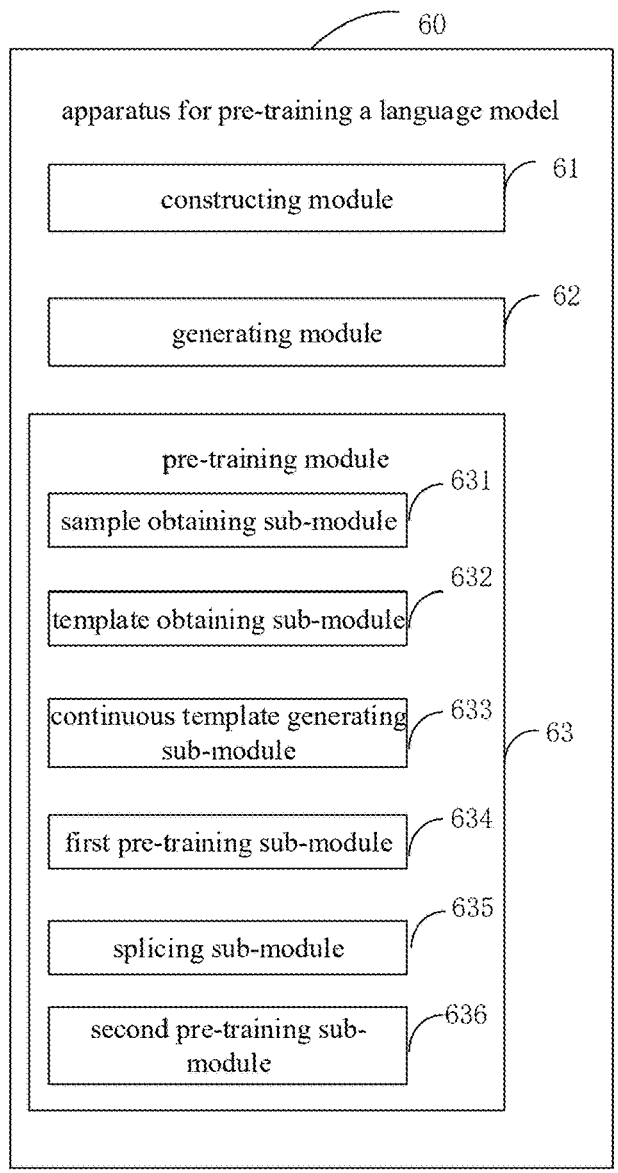
FIG. 8 is a block diagram illustrating an apparatus for pre-training a language model according to further embodiments of the present disclosure.

As shown in FIG. 8, in an embodiment, the pre-training module 63 includes: a sample obtaining sub-module 631, configured to obtain a sample text from the language model; a template obtaining sub-module 632, configured to obtain a task template and a task sub-template corresponding to the sample text based on a task category to which the sample text belongs; a continuous template generating sub-module 633, configured to generate a continuous template based on the task template and the task sub-template corresponding to the sample text; a first pre-training sub-module 634, configured to pre-train the language model by inputting the sample text and the continuous template into the language model.

As shown in FIG. 8, in an embodiment, the pre-training module 63 further includes: a splicing sub-module 635, configured to splice the continuous template to the beginning of the sample text.

As shown in FIG. 8, in an embodiment, the pre-training module 63 further includes: a second pre-training sub-module 636, configured to jointly pre-train the language model with the unsupervised language data and the supervised language data.

As an implementation, the apparatus is further configured to jointly pre-train the pre-training model by the unsupervised data and the supervised data.

It should be noted that the foregoing explanation of the method embodiments, which is also applicable to the embodiments of the apparatus of the present disclosure under the same principle, and will not be elaborated here.

In the apparatus for pre-training the language model of the embodiments of the present disclosure, the pre-training language data set is constructed, in which the pre-training language data set includes the unsupervised language data and the supervised language data; the hierarchical multi-template and multi-task language data set is generated based on the pre-training language data set; and the language model is pre-trained based on the hierarchical multi-template and multi-task language data set. Therefore, according to the embodiments of the present disclosure, the tasks can be uniformly templated by constructing the multi-template and multi-task language data set, so that the model can simultaneously model multi-task data, and by setting multiple tasks, the diversity of the model is increased and the robustness of the task learning of the model is improved. The knowledge related to the task and the data set can be better learned by using the continuous template during the pre-training of the model, and the migration capability of the model in the case of zero sample or few samples is improved.

Based on the construction of the pre-training language data set, the present disclosure provides jointly training the language model with the unsupervised general data and the supervised task data, so that the language model can not only model the task data, but also continuously learn the general knowledge from the unsupervised data, so as to avoid forgetting the knowledge.

To achieve the above embodiments, the present disclosure further provides an electronic device. The electronic device may include at least one processor, and a memory, communicatively connected to the at least one processor. The memory stores instructions executable by the at least one processor, and the instructions are executed by the at least one processor to enable the at least one processor to perform the method of any of the above embodiments of the present disclosure.

To achieve the above embodiments, the present disclosure further provides a non-transitory computer readable storage medium having computer instructions stored thereon. The computer instructions are configured to implement the method according to any of the above embodiments of the present disclosure.

To achieve the above embodiments, the present disclosure further provides a computer program product. The computer program product includes a computer program. The computer program is configured to implement the method according to any of the above embodiments of the present disclosure when executed by a processor.

According to embodiments of the present disclosure, the present disclosure provides the electronic device, the non-transitory computer readable storage medium, and the computer program product.

Figure 9:
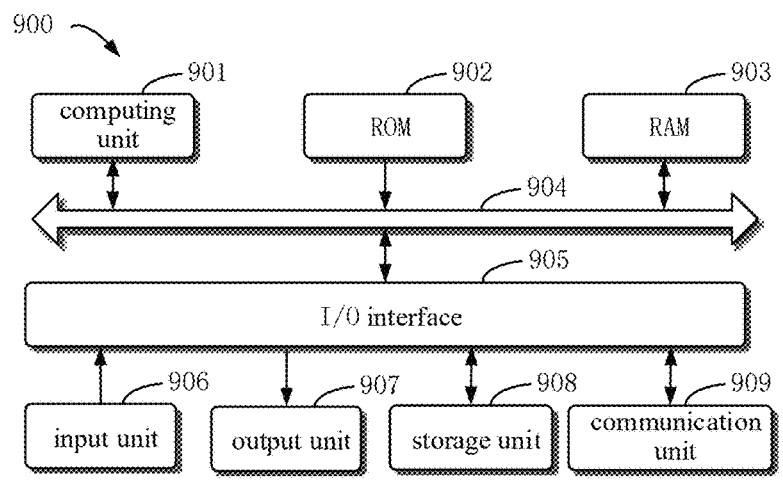
FIG. 9 is a block diagram illustrating an electronic device according to embodiments of the present disclosure.

FIG. 9 is a block diagram illustrating an electronic device 900 for implementing the embodiments of the disclosure. The electronic device is intended to represent various forms of digital computers, such as laptops, desktops, workstations, personal digital assistants, servers, blade servers, mainframe computers and other suitable computing devices. The electronic device may further represent various forms of mobile devices, such as personal digital assistants, cellular phones, smart phones, wearable devices and other similar computing devices. The components shown herein, connections and relationships therebetween, and functions thereof are examples only, and are not intended to limit the implementation of the present disclosure as described and/or required herein.

As shown in FIG. 9, the electronic device 900 includes a computing unit 901. The computing unit 901 may perform various appropriate actions and processes based on a computer program stored in a read only memory (ROM) 902 or a computer program loaded from a storage unit 908 into a random access memory (RAM) 903. In the RAM 903, various programs and data required for the operations of the device 900 may also be stored. The computing unit 901, the ROM 902, and the RAM 903 are connected to each other via a bus 904. An input/output (I/O) interface 905 is also connected to the bus 904.

Components in the electronic device 900 are connected to the I/O interface 905. The components include an input unit 906, such as a keyboard, and a mouse; an output unit 907, such as various types of displays and speakers; a storage unit 908, such as a magnetic disk, and an optical disk; and a communication unit 909, such as a network card, a modem, and a wireless communication transceiver. The communication unit 909 allows the electronic device 900 to exchange information/data with other devices via a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 901 performs various methods and processes described above, such as the pre-training method. For example, in some embodiments, the above pre-training method may be implemented as a computer software program tangibly embodied in a machine-readable medium, such as the storage unit 908. In some embodiments, a part or all of the computer program may be loaded and/or installed on the electronic device 900 via the ROM 902 and/or the communication unit 909. When the computer program is loaded into the RAM 903 and executed by the computing unit 901, one or more operations of the pre-training method described above may be executed. Alternatively, in other embodiments, the computing unit 901 may be configured to perform the above pre-training method by any other suitable means (for example, by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or any combination thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), the Internet and a block chain network.

The computer device may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with a block chain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above-mentioned embodiments do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:
1. A computer-implemented method of pre-training a language model for text generation, comprising:
   constructing a pre-training language data set, wherein the pre-training language data set comprises unsupervised language data and supervised language data;
   generating a hierarchical multi-template and multi-task language data set based on the pre-training language data set; and
   pre-training the language model based on the hierarchical multi-template and multi-task language data set;
   wherein the supervised language data comprises a multi-task language data set, and generating the hierarchical multi-template and multi-task language data set based on the pre-training language data set comprises:
      setting a task template corresponding to each task language data set in the multi-task language data set, and at least one task sub-template corresponding to each task template; and
      generating the hierarchical multi-template and multi-task language data set by dividing each task language data set into at least one task category based on the at least one task sub-template corresponding to each task language data set;

wherein the language model is jointly pre-trained with the unsupervised language data and the supervised language data, and pre-training the language model comprises using an objective function of:

$$L=\Sigma_{i=1}^{n}-\log P(x_i|x_{<i})+\Sigma_{j=1}^{m}-\log P(y_j|x,y_{<j})$$

where x represents a sample text with a total length n, and y represents a supervised data set with a total length m, wherein a loss value of $\Sigma_{i=1}^{n}-\log P(x_i|x_{<i})$ is optimized with the unsupervised language data, and a loss value of $\Sigma_{i=1}^{n}-\log P(x_i|x_{<i})$ is optimized with the supervised language data;

wherein pre-training the language model based on the hierarchical multi-template and multi-task language data set further comprises:
- obtaining a sample text from the language model;
- obtaining a task template and a task sub-template corresponding to the sample text based on a task category to which the sample text belongs;
- generating a continuous template based on the task template and the task sub-template corresponding to the sample text; and
- pre-training the language model by inputting the sample text and the continuous template into the language model;

wherein the continuous template is spliced to a beginning of the sample text.

2. The method of claim 1, wherein the language model is generated by training with multi-granularity unsupervised language data.

3. The method of claim 2, wherein the language model is generated by:
- extracting sample language data of first, second, third and fourth granularities from the multi-granularity unsupervised language data; and
- generating the language model by training an initial model based on the sample language data of each of the first to fourth granularities.

4. The method of claim 2, wherein the training is bidirectional training.

5. The method of claim 3, wherein the first, second, third and fourth granularities are a word granularity, a sentence granularity, a paragraph granularity and a chapter granularity, respectively.

6. An electronic device, comprising:
- at least one processor; and
- a memory, communicatively connected to the at least one processor;
- wherein the memory stores instructions executable by the at least one processor, and the instructions are executed by the at least one processor to enable the at least one processor to perform a method of pre-training a language model for text generation, comprising:
  - constructing a pre-training language data set, wherein the pre-training language data set comprises unsupervised language data and supervised language data;
  - generating a hierarchical multi-template and multi-task language data set based on the pre-training language data set; and
  - pre-training the language model based on the hierarchical multi-template and multi-task language data set;
- wherein the supervised language data comprises a multi-task language data set, and generating the hierarchical multi-template and multi-task language data set based on the pre-training language data set comprises:
  - setting a task template corresponding to each task language data set in the multi-task language data set, and at least one task sub-template corresponding to each task template; and
  - generating the hierarchical multi-template and multi-task language data set by dividing each task language data set into at least one task category based on the at least one task sub-template corresponding to each task language data set;
- wherein the language model is jointly pre-trained with the unsupervised language data and the supervised language data, and pre-training the language model comprises using an objective function of:

$$L=\Sigma_{i=1}^{n}-\log P(x_i|x_{<i})+\Sigma_{j=1}^{m}-\log P(y_j|x,y_{<j})$$

where x represents a sample text with a total length n, and y represents a supervised data set with a total length m, wherein a loss value of $\Sigma_{i=1}^{n}-\log P(x_i|x_{<i})$ is optimized with the unsupervised language data, and a loss value of $\Sigma_{i=1}^{n}-\log P(x_i|x_{<i})$ is optimized with the supervised language data;

wherein pre-training the language model based on the hierarchical multi-template and multi-task language data set further comprises:
- obtaining a sample text from the language model;
- obtaining a task template and a task sub-template corresponding to the sample text based on a task category to which the sample text belongs;
- generating a continuous template based on the task template and the task sub-template corresponding to the sample text; and
- pre-training the language model by inputting the sample text and the continuous template into the language model;

wherein the continuous template is spliced to a beginning of the sample text.

7. The electronic device of claim 6, wherein the language model is generated by training with multi-granularity unsupervised language data.

8. The electronic device of claim 7, wherein the language model is generated by:
- extracting sample language data of first, second, third and fourth granularities from the multi-granularity unsupervised language data; and
- generating the language model by training an initial model based on the sample language data of each of the first to fourth granularities.

9. The electronic device of claim 8, wherein the first, second, third and fourth granularities are a word granularity, a sentence granularity, a paragraph granularity and a chapter granularity, respectively.

10. A computer-implemented text generation method, comprising:
- acquiring a task of generating a text; and
- inputting the task into a language model to acquire a text result output by the language model, wherein the language model is pre-trained by a method for training the language model comprising:
  - constructing a pre-training language data set, wherein the pre-training language data set comprises unsupervised language data and supervised language data;
  - generating a hierarchical multi-template and multi-task language data set based on the pre-training language data set; and
  - pre-training the language model based on the hierarchical multi-template and multi-task language data set;

wherein the supervised language data comprises a multi-task language data set, and generating the hierarchical multi-template and multi-task language data set based on the pre-training language data set comprises:
   setting a task template corresponding to each task language data set in the multi-task language data set, and at least one task sub-template corresponding to each task template; and
   generating the hierarchical multi-template and multi-task language data set by dividing each task language data set into at least one task category based on the at least one task sub-template corresponding to each task language data set;

wherein the language model is jointly pre-trained with the unsupervised language data and the supervised language data, and pre-training the language model comprises using an objective function of:

$$L = \Sigma_{i=1}^{n} -\log P(x_i|x_{<i}) + \Sigma_{j=1}^{m} -\log P(y_j|x, y_{<j})$$

where x represents a sample text with a total length n, and y represents a supervised data set with a total length m, wherein a loss value of $\Sigma_{i=1}^{n} -\log P(x_i|x_{<i})$ is optimized with the unsupervised language data, and a loss value of $\Sigma_{i=1}^{n} -\log P(x_i|x_{<i})$ is optimized with the supervised language data;

wherein pre-training the language model based on the hierarchical multi-template and multi-task language data set further comprises:
   obtaining a sample text from the language model;
   obtaining a task template and a task sub-template corresponding to the sample text based on a task category to which the sample text belongs;
   generating a continuous template based on the task template and the task sub-template corresponding to the sample text; and
   pre-training the language model by inputting the sample text and the continuous template into the language model;

wherein the continuous template is spliced to a beginning of the sample text.

* * * * *